US008384933B2

United States Patent
Eguchi et al.

(10) Patent No.: US 8,384,933 B2
(45) Date of Patent: Feb. 26, 2013

(54) IMAGE FORMING APPARATUS PROVIDING SCAN DATA ALONG WITH ADVERTISEMENT DATA

(75) Inventors: Tatsuya Eguchi, Toyohashi (JP); Toshikazu Higashi, Toyokawa (JP); Hiroshi Eguchi, Okazaki (JP); Tatsutoshi Yamada, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 913 days.

(21) Appl. No.: 12/335,224

(22) Filed: Dec. 15, 2008

(65) Prior Publication Data

US 2009/0213405 A1 Aug. 27, 2009

(30) Foreign Application Priority Data

Feb. 27, 2008 (JP) ................................ 2008-046504

(51) Int. Cl.
*G06F 3/012* (2006.01)
*G06K 15/00* (2006.01)
*H04N 1/046* (2006.01)
*G06Q 30/00* (2006.01)

(52) U.S. Cl. ...... 358/1.15; 358/1.14; 358/537; 358/540; 358/1.13; 705/14.72; 705/14.73

(58) Field of Classification Search ........ 358/1.11–1.18, 358/474; 705/14

See application file for complete search history.

(56) References Cited

U.S. PATENT DOCUMENTS

| | | | |
|---|---|---|---|
| 2004/0054580 A1* | 3/2004 | Kamei et al. | 705/14 |
| 2007/0002388 A1* | 1/2007 | Henry et al. | 358/400 |
| 2007/0088852 A1* | 4/2007 | Levkovitz | 709/246 |
| 2008/0046502 A1 | 2/2008 | Kamei et al. | |

FOREIGN PATENT DOCUMENTS

| | | |
|---|---|---|
| JP | 2002-197340 | 7/2002 |
| JP | 2003-52032 | 2/2003 |
| JP | 2003-173448 | 6/2003 |
| JP | 2005-51377 | 2/2005 |
| JP | 2007-19929 | 1/2007 |
| JP | 2007019929 A * | 1/2007 |

OTHER PUBLICATIONS

Japanese Notice of Grounds of Rejection, mailed Jan. 5, 2010, directed to counterpart Japanese Patent Application No. 2008-046504; 5 pages.

* cited by examiner

*Primary Examiner* — Twyler Haskins
*Assistant Examiner* — Chad Dickerson
(74) *Attorney, Agent, or Firm* — Morrison & Foerster LLP

(57) ABSTRACT

When a user selects not to insert advertisement data into scan data when transferring the scan data from an MFP to a Web server, the MFP converts the advertisement data into an HTML format to transfer to the Web server in association with the scan data. Accordingly, a PC accessing the Web server displays a Web page showing contents of the advertisement and information including an icon functioning as means for requesting download of the scan data. The scan data inserted with no advertisement data is downloaded to the PC by operating the icon.

11 Claims, 18 Drawing Sheets

FIG.9

INPUT E-MAIL ADDRESS

E-MAIL ADDRESS INPUT SCREEN

_____@_____

| 1 | 2 | 3 | 4 | 5 | 6 | 7 | 8 | 9 | 0 |
|---|---|---|---|---|---|---|---|---|---|
| a | b | c | d | e | f | g | h | i | j |
| k | l | m | n | o | p | q | r | s | t |
| u | v | w | x | y | z | . |   |   |   |

| ← | → | SPACE | DELETE ONE CHARACTER | DELETE ALL |

CANCEL  COMPLETION

FIG.10

SET DOCUMENT SHEET

CONTINUOUS READ IS AVAILABLE

DOCUMENT SETTING IS COMPLETED — 14A

READ IS ENDED — 14B

IMAGE FORMING APPARATUS PROVIDING SCAN DATA ALONG WITH ADVERTISEMENT DATA

This application is based on Japanese Patent Application No. 2008-046504 filed with the Japan Patent Office on Feb. 27, 2008, the entire content of which is hereby incorporated by reference.

BACKGROUND OF THE INVENTION

1. Field of the Invention

The present invention relates to an image forming apparatus, an image forming system, and an image information providing method, and particularly relates to an image forming apparatus scanning a document to provide scan data in which the document is formed into electronic data along with advertisement data, an image forming system, and an image information providing method thereof.

2. Description of the Related Art

One of methods for utilizing an image scan apparatus such as a scanner and an MFP (Multi Function Peripheral) serving as a complex machine provided with a scan function and a print function is to scan a document by an image forming apparatus to provide the scan data in which the document is formed into electronic data. There is a business which exhibits an advertisement in providing the scan data, thereby offering a free or small usage fee for the image scan apparatus in forming the document into the electronic data. In one of the method for providing advertisement, the advertisement is provided by embedding the advertisement data in the scan data. For example, Japanese Laid-Open Patent Publication No. 2003-173448 discloses such an advertisement data embedding method. On the other hand, Japanese Laid-Open Patent Publication No. 2002-197340 discloses another method for providing the advertisement through a network.

However, a user as a receiver of the scan data does not want the advertisement data to be embedded in the scan data in some cases. To those users, the above conventional method cannot provide the scan data desired by such users.

SUMMARY OF THE INVENTION

In view of the foregoing, an object of the present invention is to provide an image forming apparatus scanning a document to provide scan data in which the document is formed into electronic data along with advertisement data, an image forming system, and an image information providing method thereof, whereby an advertisement effect can be improved while convenience for the user as a receiver of the scan data is improved.

In order to achieve the above-described object, in accordance with an aspect of the present invention, an image forming apparatus includes: a scanner scanning a document to obtain scan data; an insertion unit inserting advertisement data into the scan data; a specification unit specifying a forwarding destination of the scan data; a transfer unit transferring scan data to the forwarding destination; a determination unit determining whether or not insertion of the advertisement data into the scan data is necessary in accordance with the forwarding destination; and a controller controlling insertion of the advertisement data by the insertion unit and transfer by the transfer unit, wherein the controller causes the insertion unit to perform a processing for inserting the advertisement data into the scan data and causes the transfer unit to transfer the scan data inserted with the advertisement data to the forwarding destination, when the determination unit determines that the advertisement data is inserted into the scan data, and the controller causes the insertion unit not to perform the processing for inserting the advertisement data into the scan data and causes the transfer unit to transfer to the forwarding destination the scan data and the advertisement data in association with each other, when the determination unit determines that the advertisement data is not inserted into the scan data.

In accordance with another aspect of the present invention, an image forming system includes: an image forming apparatus; a Web server; and a mail server, the image forming apparatus, the Web server, and the mail server being connected with one another through an electric communication line, wherein the image forming apparatus includes: a scanner scanning a document to obtain scan data; an insertion unit inserting advertisement data into the scan data; a specification unit specifying a forwarding destination of the scan data from a forwarding destination group including destinations each identified by the Web server and an electronic mail address; a selection unit selecting whether or not the advertisement data can be inserted into the scan data; a transfer unit transferring the scan data to the forwarding destination; a determination unit determining whether or not insertion of the advertisement data into the scan data is necessary in accordance with the forwarding destination and selection by the selection unit; and a controller controlling insertion of the advertisement data by the insertion unit and transfer by the transfer unit, in which the controller causes the insertion unit not to insert the advertisement data into the scan data, and causes the transfer unit to transfer to the Web server the scan data and the advertisement data in association with each other, when the forwarding destination is the Web server and the determination unit determines that the advertisement data is not inserted into the scan data, and the controller causes the insertion unit not to insert the advertisement data into the scan data, generates mail data provided with information including the advertisement data as a body and the scan data as an attached file, and causes the transfer unit to transfer the mail data to the mail server, when the forwarding destination is identified by the electronic mail address and the determination unit determines that the advertisement data is not inserted into the scan data.

In accordance with another aspect of the present invention, there is provided a method for providing image information from an image forming apparatus including a document scanner to another apparatus, and the method includes: a step of scanning the document by using the image scanner to obtain scan data; a specifying step of accepting specification of a forwarding destination of the scan data; a determining step of determining whether or not insertion of the advertisement data into the scan data is necessary in accordance with the forwarding destination; a first transferring step of inserting the advertisement data into the scan data and transferring to the forwarding destination the scan data inserted with the advertisement data, when determined in the determining step to insert the advertisement data into the scan data; and a second transferring step of not inserting the advertisement data into the scan data and transferring to the forwarding destination the scan data and the advertisement data in association with each other, when determined in the determining step not to insert the advertisement data into the scan data.

According to the present invention, when the document is scanned by the image forming apparatus to provide scan data in which the document is formed into electronic data along with advertisement data, the advertisement effect can be improved while the convenience for the user as a receiver of the scan data is improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9 to 11 show specific examples of screens.

DESCRIPTION OF THE PREFERRED EMBODIMENTS

An exemplary embodiment of the present invention will be described below with reference to the drawings. In the following description, the same component or constituent is designated by the same numeral, and the same component or constituent has the same name and function.

In an image forming system according to the present embodiment, an MFP (Multi Function Peripheral) functioning as a image scan apparatus scans a document to provide, along with advertisement, scan data in which the document is formed into electronic data. Therefore, the image forming system according to the present embodiment is used in businesses where free or smaller usage fees of equipment are offered in forming a document into electronic data.

Figure 1:
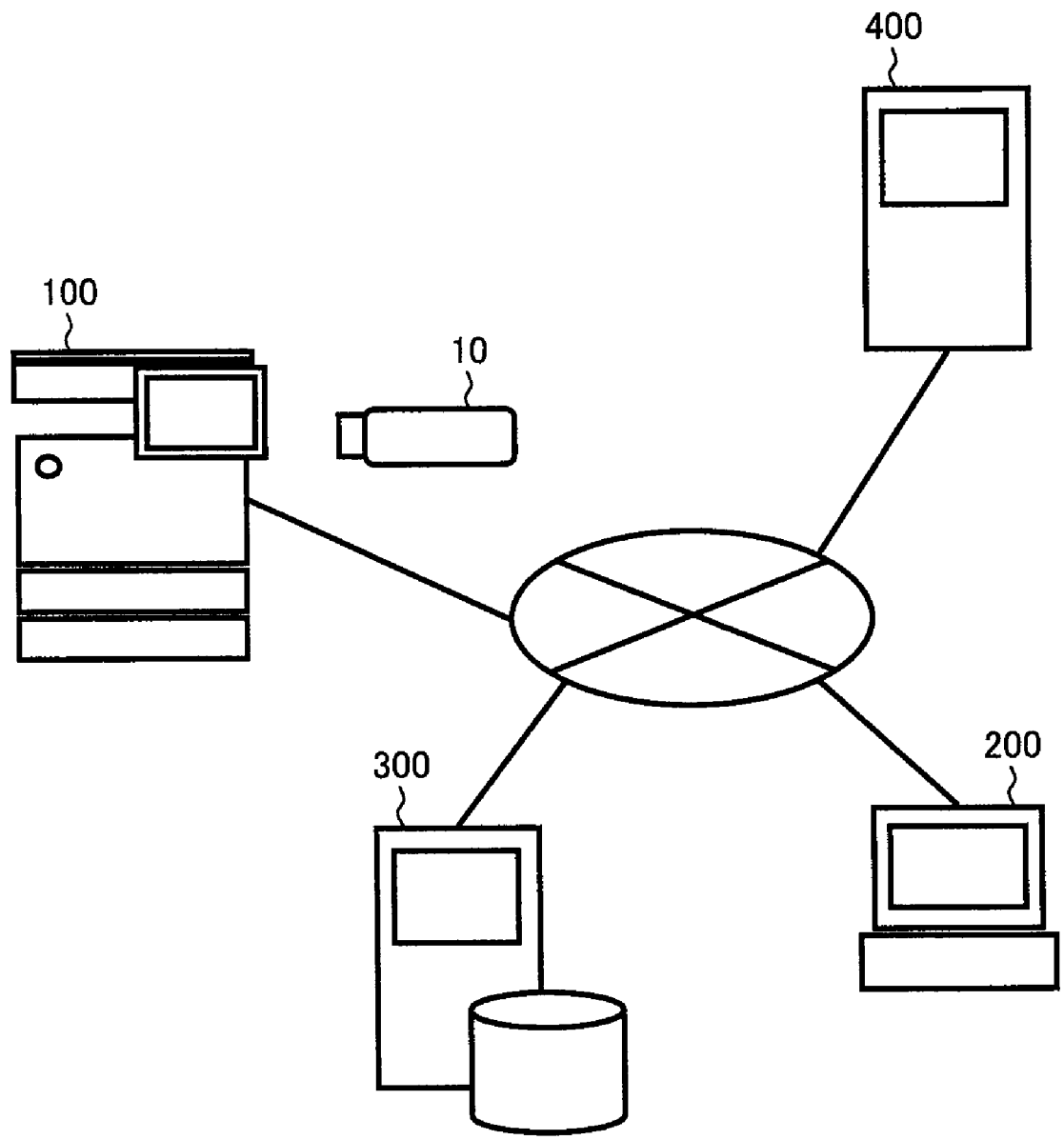
FIG. 1 shows a specific example of an image forming system according to an embodiment of the present invention.

Referring to FIG. 1, the image forming system according to the embodiment includes an MFP 100 as a specific example of an image forming apparatus, a user personal computer (hereinafter, referred to as a user PC) 200 functioning as an image processing device used by a user to whom image data is provided, an SMTP (Simple Mail Transfer Protocol) server 300 functioning as a mail server which includes a mail box and transmits a mail to a destination identified by an electronic mail address, and a Web server 400. MFP 100, user PC 200, SMTP server 300, and Web server 400 are connected to one another through a network such as the Internet. The network may be connected in a wired manner or a wireless manner, and the wired network and the wireless network are collectively referred to as networks connected through electric communication lines.

It is assumed that MFP 100 is installed in a store or an office. Usually image forming processing is charged in the image forming apparatus such as MFP installed in the shop to provide the image forming processing. However, it is assumed that MFP 100 of the embodiment has a mode in which the image forming processing is provided at no charge in addition to (or instead of) the mode in which the image forming processing is provided while charged. Specifically, in the image forming processing, the document is electronically scanned to generate the electronic data, and the electronic data is transferred to a given forwarding destination. In the "charge-free scan mode", no usage fee of equipment is charged in scanning the document to form the document into the electronic data. MFP 100 of the embodiment provides both the electronic data and the advertisement data in the "charge-free scan mode".

A recording medium is detachably attached to MFP 100. MFP 100 has a function of writing data in the recording medium. Although the recording medium is formed by a USB (Universal Serial Bus) memory 10, another type of recording medium may be used.

In the following description, it is assumed that MFP 100 is a color tandem type MFP. However, in the image forming apparatus of the present invention, the image forming method is not limited to the tandem type, and the image forming method is not limited to the digital type. A monochrome image forming apparatus may be used.

Figure 2:
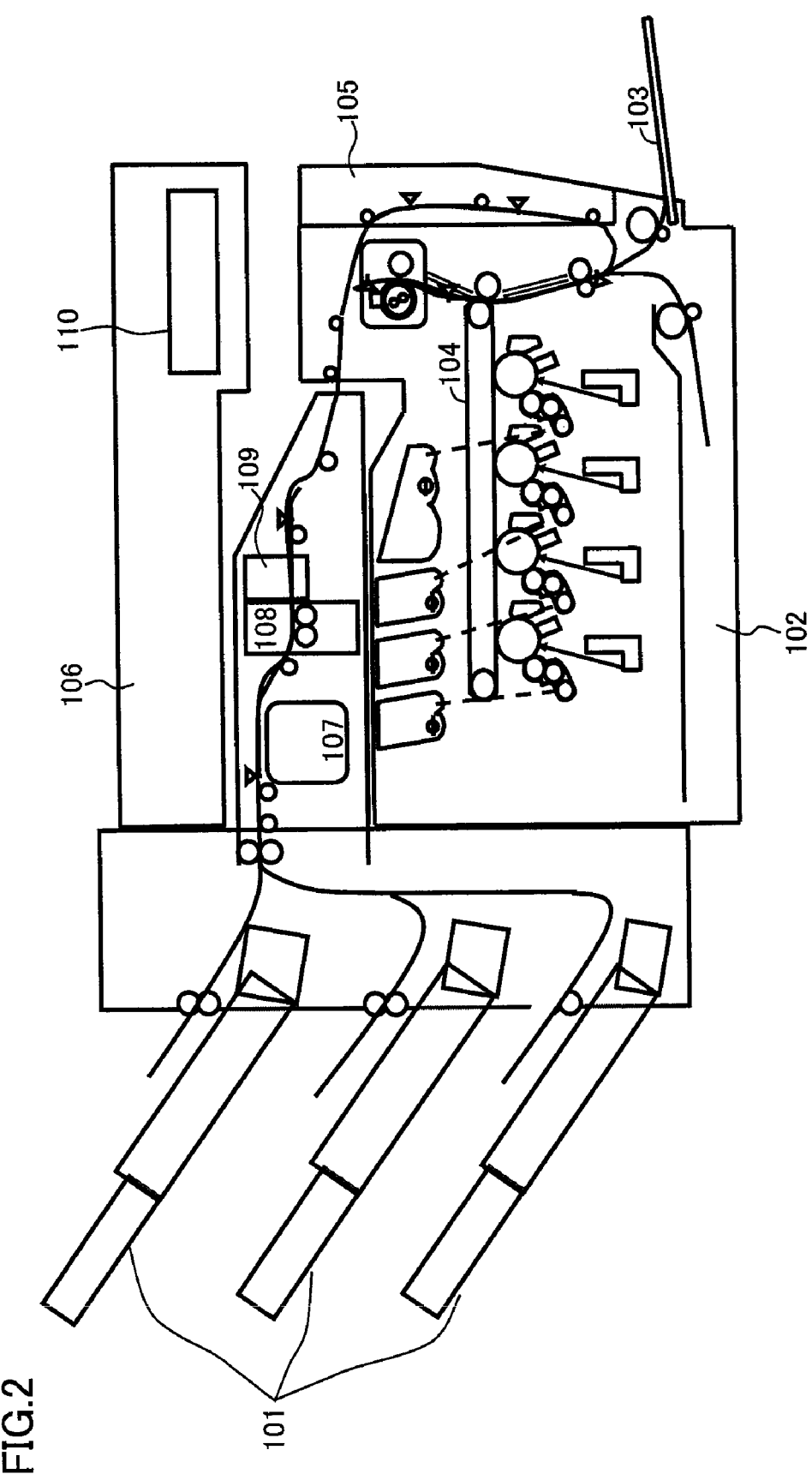
FIG. 2 is a schematic sectional view showing a specific example of a hardware configuration of an MFP functioning as an image forming apparatus according to the embodiment of the present invention.

Referring to FIG. 2, color tandem type MFP 100 includes an intermediate transfer belt 104, a sheet feeding cassette 102, a manual sheet feeding tray 103, a scanner 106, and an operation panel 110. Intermediate transfer belt 104 functioning as an intermediate transfer body is provided near the center of MFP 100, sheet feeding cassette 102 and manual sheet feeding tray 103 are provided in a lower portion thereof, scanner 106 and operation panel 110 are provided in an upper portion thereof. MFP 100 includes a stack tray 101 accumulating discharged sheets. Four-color image forming units each including a development device are arranged along intermediate transfer belt 104. MFP 100 further includes a stapler 107, a folding unit 108, and a punch unit 109 respectively functioning as post-treatment devices.

Operation panel 110 accepts operation of a user. A toner image having each color is formed in each development device according to the operation of the user. The toner image having each color formed in each development device is transferred to intermediate transfer belt 104. This is called primary transfer. The transferred toner images having colors are superimposed on intermediate transfer belt 104 to form a multi-color image. A print sheet serving as a print medium stored in sheet feeding cassette 102 or a print sheet fed from manual sheet feeding tray 103 is conveyed to intermediate transfer belt 104. The multi-color image formed on the intermediate transfer belt 104 is transferred onto the print sheet. This is called secondary transfer. The print sheet to which the secondary transfer is performed passes through a fixing process to perform a fixing process, and the print sheet passes through a post-treatment device to perform a post-treatment. Then the print sheet is discharged to stack tray 101.

Figure 3:
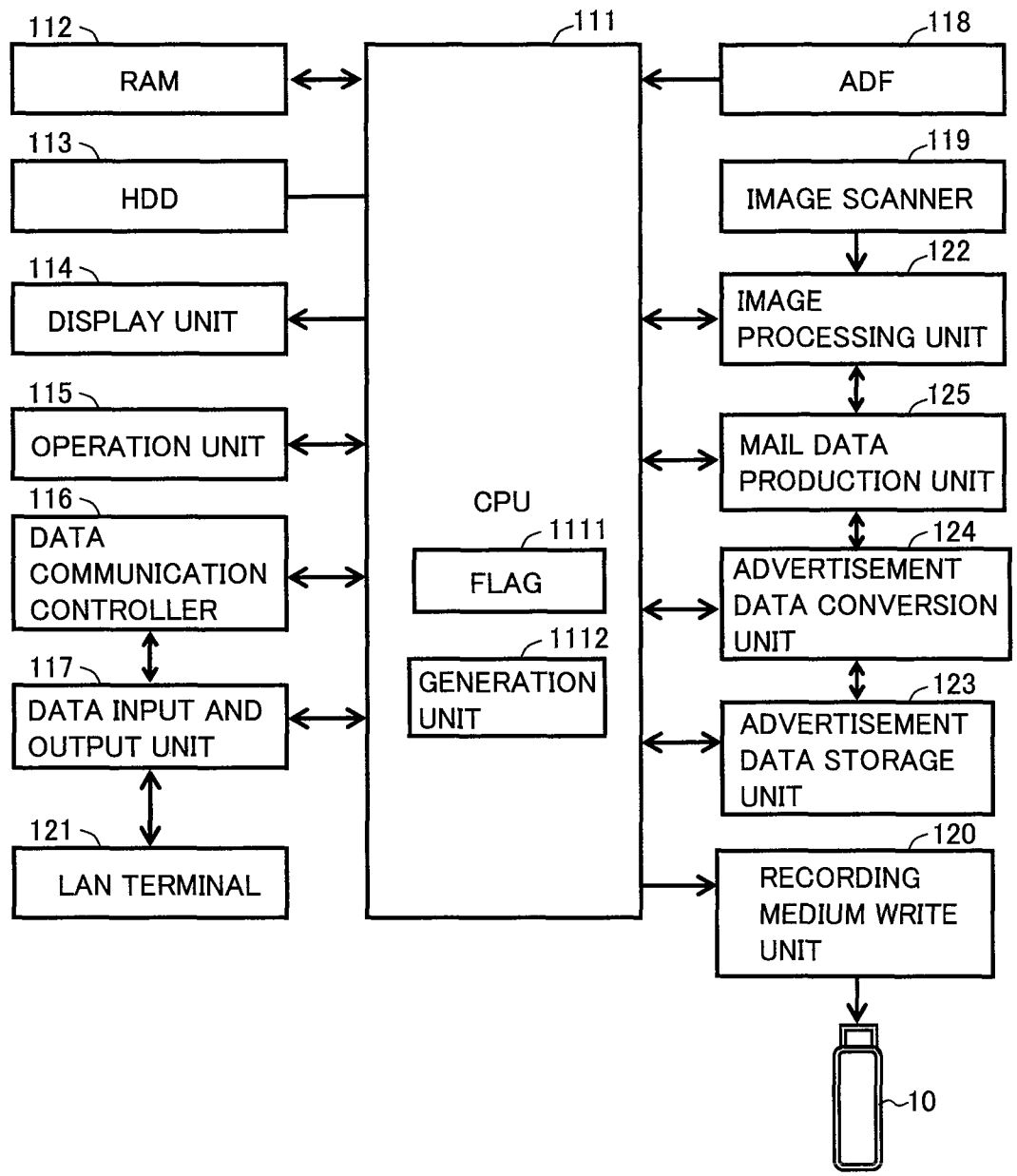
FIG. 3 is a block diagram showing a specific example of a functional configuration of the MFP functioning as the image forming apparatus according to the embodiment.

Referring to FIG. 3, MFP 100 includes CPU (Central Processing Unit) 111, RAM (Random Access Memory) 112, HDD (Hard Disk Drive) 113, a display unit 114, an operation unit 115, a data communication controller 116, a data input and output unit 117, automatic document feeder (hereinafter, referred to as an ADF) 118, an image scanner 119, a recording medium write unit 120, LAN (Local Area Network) terminal 121, an image processing unit 122, an advertisement data storage unit 123, an advertisement data conversion unit 124, and a mail data production unit 125. CPU 111 includes a flag 1111 and a generation unit 1112. These functions may be realized by the hardware configuration of MFP 100 shown in FIG. 2, or CPU 111 may read and execute a program stored in RAM 112, whereby CPU 111 performs these functions.

Operation unit 115 including operation panel 110 and the like inputs an operation signal into CPU 111 according to an instruction operation by the user. CPU 111 reads a predetermined program from RAM 112 to execute the program according to the operation signal, and outputs a control signal to each unit. Display unit 114 performs processing for displaying an operation screen necessary during the operation on operation panel 110 according to the control signal from CPU 111.

Scanner 106 includes ADF 118 and image scanner 119. ADF 118 and image scanner 119 work according to the control signal from CPU 111. Therefore, the documents placed on the ADF 118 are automatically conveyed one by one to image scanner 119, and the document is read with image scanner 119. The image data (hereinafter, the image data is referred to as scan data) obtained by scanning the document with image scanner 119 is input into image processing unit 122, and predetermined image processing is performed to the scan data. The scan data processed by image processing unit 122 is stored as electronic data in HDD 113.

CPU 111 makes a determination of a forwarding destination of the scan data based on the operation signal. CPU 111 also determines whether or not the advertisement data is embedded in the scan data.

CPU 111 reads the advertisement data stored in advertisement data storage unit 123 according to the determination result, and CPU 111 inputs the advertisement data into advertisement data conversion unit 124 along with the control signal. Advertisement data conversion unit 124 converts the advertisement data into advertisement data having a data format corresponding to the forwarding destination according to the control signal, and advertisement data conversion unit 124 inputs the converted advertisement data into CPU 111. Sometimes the advertisement data in an HTML (Hypertext Markup Language) format is previously stored in advertisement data storage unit 123. In such cases, MFP 100 does not include advertisement data conversion unit 124, and it is not necessary to perform the data conversion. CPU 111 inputs the scan data stored in HDD 113 and the converted advertisement data in association with each other into data communication controller 116 and data input and output unit 117 along with the control signal for transferring the scan data and advertisement data to the determined forwarding destination. Alternatively, CPU 111 inputs the scan data stored in HDD 113 and the converted advertisement data in association with each other into mail data production unit 125 along with the control signal. Mail data production unit 125 converts the converted advertisement data and the scan data in association with each other into data in the data format corresponding to the forwarding destination, i.e., mail data, according to the control signal. Mail data production unit 125 inputs the mail data into CPU 111. CPU 111 inputs the mail data into data communication controller 116 and data input and output unit 117 along with the control signal for transferring the mail data to the determined forwarding destination.

Alternatively, CPU 111 reads the advertisement data stored in advertisement data storage unit 123 according to the determination result, and CPU 111 inputs the advertisement data into image processing unit 122 along with the control signal. Image processing unit 122 performs image processing for inserting (embedding) the advertisement data into scan data input from image scanner 119 according to the control signal. CPU 111 inputs the scan data inserted with the advertisement data into data communication controller 116 and data input and output unit 117 along with the control signal for transferring the scan data to the determined forwarding destination. Alternatively, CPU 111 inputs the scan data inserted with the advertisement data into recording medium write unit 120 along with the control signal for writing the scan data in USB memory 10 as the determined forwarding destination. Recording medium write unit 120 writes the input scan data inserted with the advertisement data in USB memory 10 according to the control signal from the CPU 111.

Data communication controller 116 inputs into data input and output unit 117 the input scan data, the scan data inserted with the advertisement data, the advertisement data and scan data in association with each other, or the control signal for transferring the mail data according to the control signal from CPU 111. As a result, data input and output unit 117 outputs the data to the network through LAN terminal 121, and the data is transferred to a predetermined forwarding destination.

In the embodiment, it is assumed that the forwarding destination of the scan data includes user PC 200, Web server 400, and USB memory 10. That is, in the embodiment, the user scans the target document with MFP 100, and the user selects one of transfer of the scan data to user PC 200, transfer of the scan data to Web server 400, and write of the scan data in USB memory 10.

In the present embodiment, it is assumed that the advertisement data is inserted into the scan data when the scan data is written in USB memory 10. That is, the selection of USB memory 10 as the forwarding destination is that the advertisement data can be inserted into the scan data. It is assumed that the determination whether or not the advertisement data is inserted into the scan data can further be selected when the scan data is transferred to user PC 200 or Web server 400. Accordingly, CPU 111 can determine that the advertisement data is inserted (embedded) into the scan data in accordance with the forwarding destination, namely, when USB memory 10 is the forwarding destination.

Figure 4:
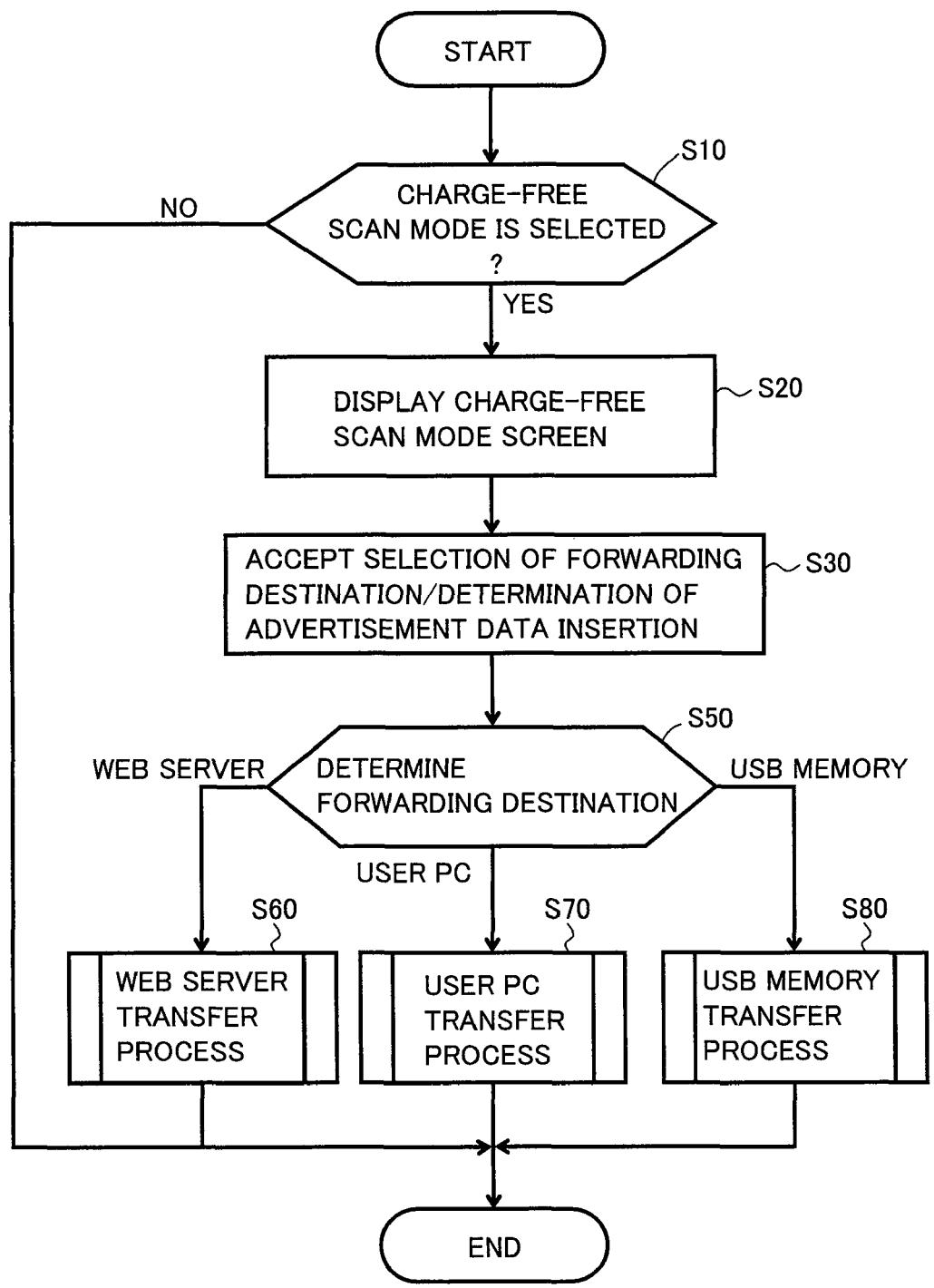
FIG. 4 is a flowchart showing a specific example of a processing flow in a "charge-free scan mode" offering a free usage fee of an apparatus in scanning a document to form electronic data.
Figure 5:
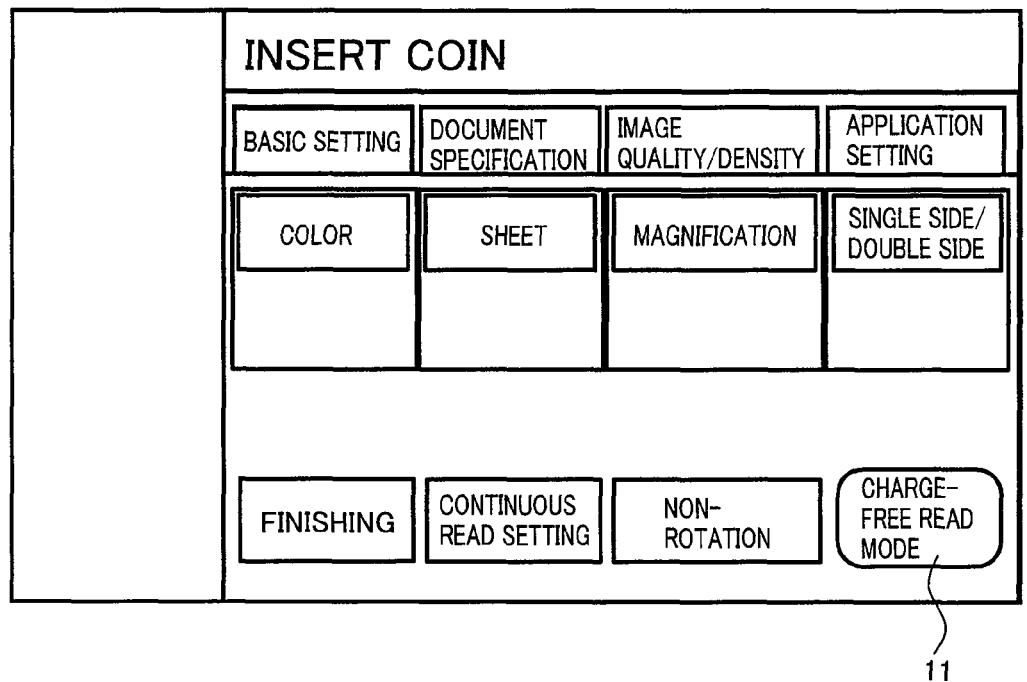
FIGS. 5 to 7 show specific examples of screens.
Figure 6:
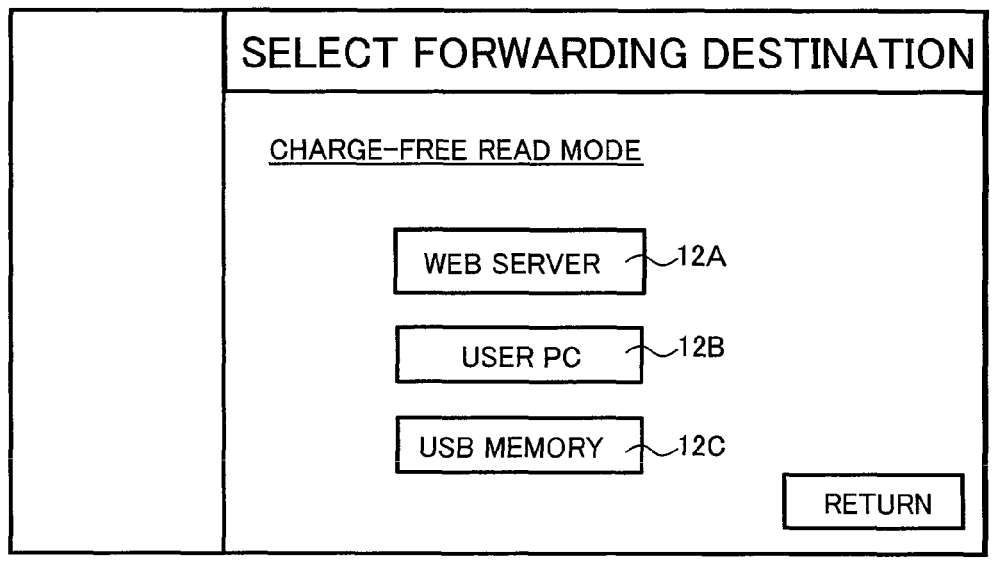
Figure 7:
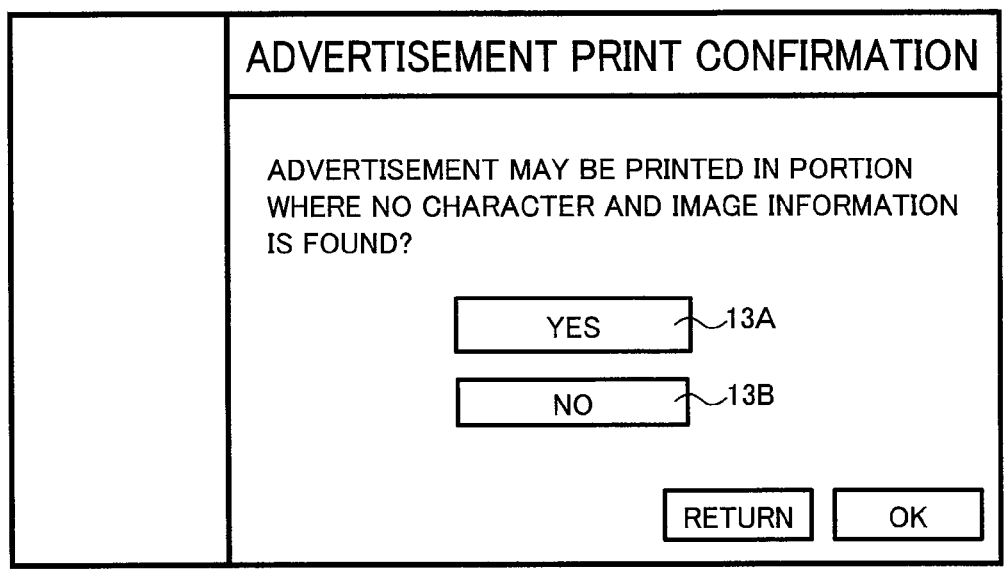

FIG. 4 is a flowchart showing a specific example of a processing flow performed by MFP 100 in a "charge-free scan mode" offering a free usage fee of an apparatus in scanning a document to form the document into electronic data. CPU 111 reads and executes the program stored in RAM 112, and CPU 111 controls each unit shown in FIG. 3, thereby realizing the processing shown in the flowchart of FIG. 4. FIGS. 5 to 7 show specific examples of operating screens displayed on operation panel 110 by display unit 114 during the processing of FIG. 4.

FIG. 5 shows a specific example of a menu screen displayed on operation panel 110 in an initial state. As shown in FIG. 5, MFP 100 accepts input of a coin as a fee for image formation, and MFP 100 accept a function to be performed and detailed settings. As described above, MFP 100 has the "charge-free scan mode". The "charge-free scan mode" is selected by pressing a button 11 in the menu screen shown in FIG. 5.

Referring to FIG. 4, in Step S10, CPU 111 monitors input of the operation signal from operation unit 115, and CPU 111 determines whether or not the "charge-free scan mode" is selected, namely, CPU 111 determines whether or not the operation signal indicating the press of button 11 of FIG. 5 is input from operation unit 115. When the "charge-free scan mode" is selected (YES in Step S10), display unit 114 changes the screen displayed on operation panel 110 from the menu screen of FIG. 5 to a first screen of FIG. 6 in the "charge-free scan mode" in Step S20. In Step S30, based on the operation signal from the operation unit 115, CPU 111 accepts selection of the forwarding destination of the scan data and a selection whether or not the advertisement data can be inserted into the scan data.

Specifically, the screen of FIG. 6 exhibits options of the forwarding destination of the scan data for the user. The user can select Web server 400 as the forwarding destination of the scan data by pressing a button 12A on the screen of FIG. 6. The user can select user PC 200 as the forwarding destination of the scan data by pressing a button 12B. The user can select USB memory 10 as the forwarding destination of the scan data by pressing a button 12C. As described above, when the scan data is written in USB memory 10, the advertisement data is embedded in the scan data. Therefore, as described above, the selection of USB memory 10 as the forwarding destination of the scan data corresponds to the selection of embedment of the advertisement data in the scan data.

On the other hand, when Web server 400 or user PC 200 is selected as the forwarding destination of the scan data, namely, when CPU 111 determines that button 12A or button 12B of FIG. 6 is pressed based on the operation signal from operation unit 115, display unit 114 changes the screen displayed on operation panel 1110 from the screen of FIG. 6 to a second screen of FIG. 7 in the "charge-free scan mode".

Specifically, the screen of FIG. 7 exhibits an option whether or not the advertisement data can be inserted into the scan data for the user. The user allows the advertisement data to be inserted into the scan data by pressing a button 13A on the screen of FIG. 7. The user prohibits the advertisement data from being inserted into the scan data by pressing a button 13B.

CPU 111 performs subsequent processings for transferring the scan data in accordance with the forwarding destination selected in Step S30. That is, when Web server 400 is selected as the forwarding destination of the scan data, CPU 111 performs processing for transferring the scan data to Web server 400 in Step S60. When user PC 200 is selected as the forwarding destination of the scan data, CPU 111 performs processing for transferring the scan data to user PC 200 in Step S70. When USB memory 10 is selected as the forwarding destination of the scan data, CPU 111 performs processing for transferring the scan data to USB memory 10 in Step S80.

Figure 8:
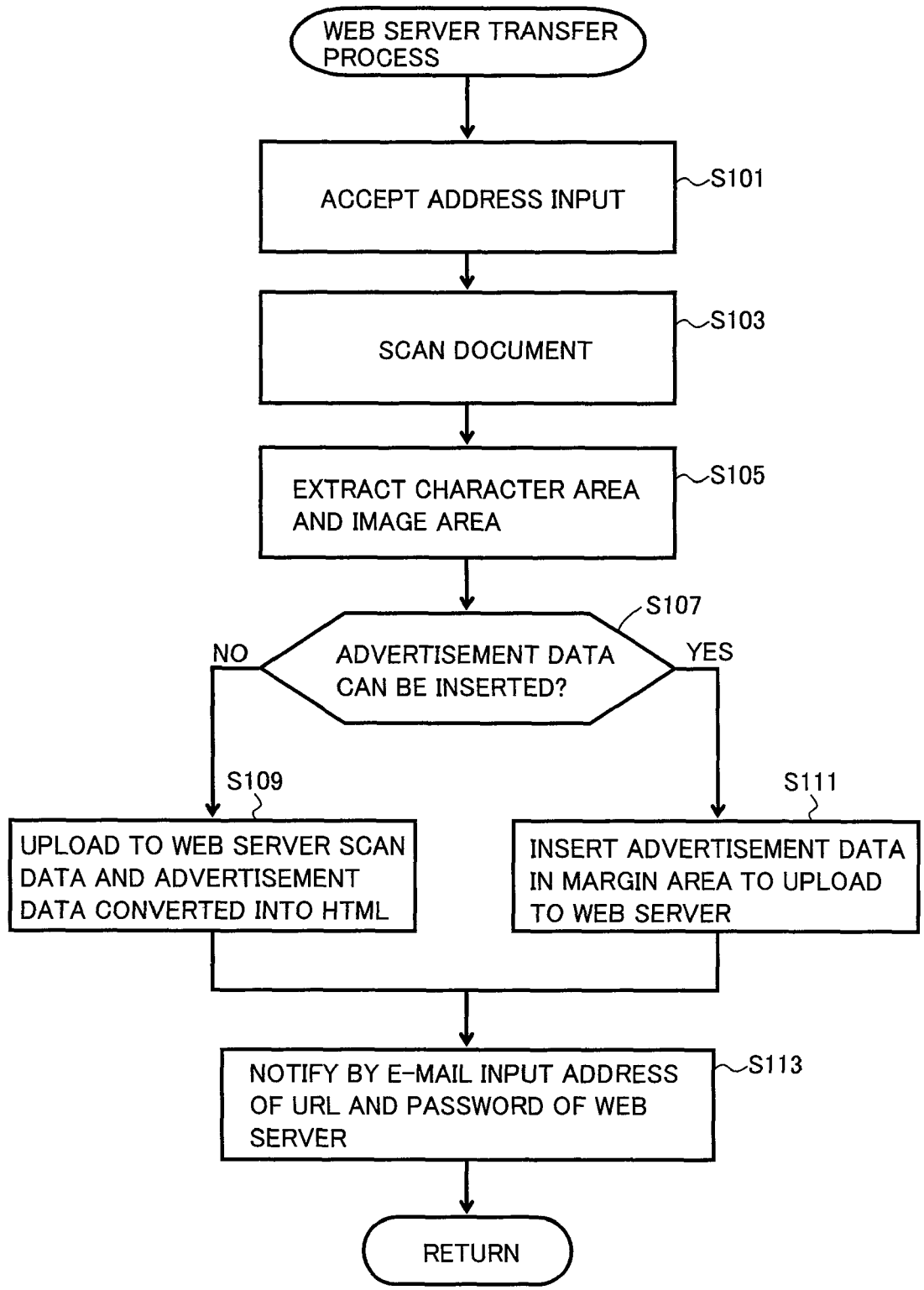
FIG. 8 is a flowchart showing a specific flow of a processing in Step S60 as a part of processings of FIG. 4.
Figure 11:
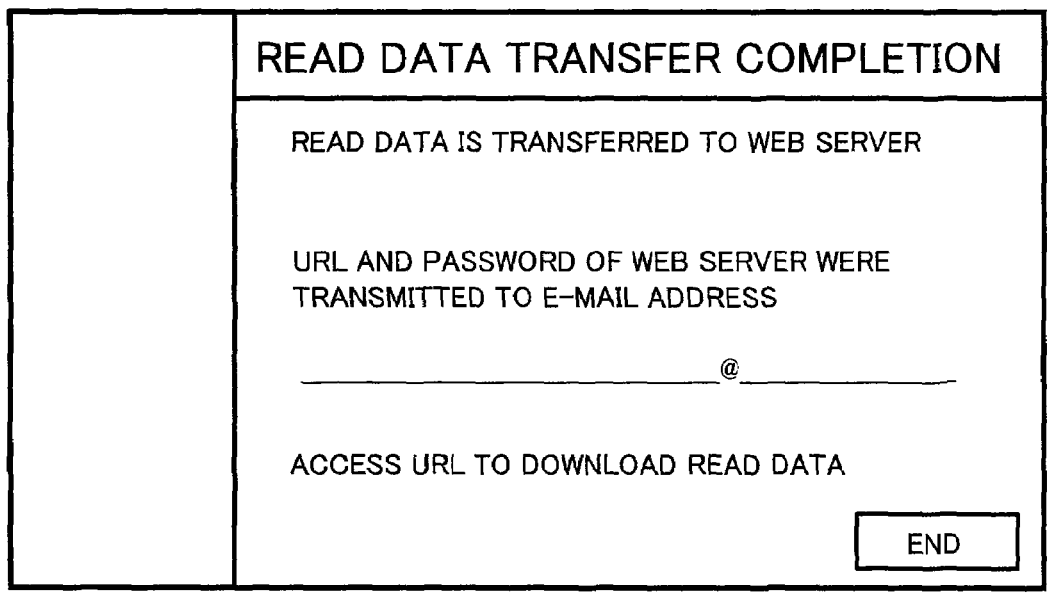

FIG. 8 is a flowchart showing a specific flow of processing performed in Step S60 for transferring the scan data to Web server 400. FIGS. 9 to 11 show specific examples of the operating screen displayed on operation panel 110 by display unit 114 during the processing of FIG. 8.

Referring to FIG. 8, in Step S101, display unit 114 displays a screen shown in FIG. 9 for accepting input of a user address on operation panel 110. CPU 111 accepts the input of the user address based on the operation signal from operation unit 115.

In Step S103, image scanner 119 electronically scans the documents placed on ADF 118 one by one. In Step S103, display unit 114 displays a screen shown in FIG. 10 on operation panel 110, completion of the document setting into ADF 118 and completion of the document scan can be detected according to the user operation. Specifically, when the user presses a button 14A of FIG. 10, CPU 111 detects the completion of the document setting into ADF 118. When the user presses a button 14B of FIG. 10, CPU 111 detects the completion of the document scan. CPU 111 may perform the detection based on a sensor signal from a sensor (not shown).

In Step S105, the electronic data generated by electronically scanning the document in Step S103 is analyzed by image processing unit 122, and a character area and an image area are extracted from the document. When the selection that the advertisement data can be inserted into the scan data is made in Step S30 (YES in Step S107), in Step S111, image processing unit 122 inserts the advertisement data into a margin area except for the areas extracted in Step S105. Data input and output unit 117 transfers the scan data inserted with the advertisement data to specified Web server 400 through LAN terminal 121.

When the selection that the advertisement data cannot be inserted into the scan data is made in Step S30 (NO in Step S107), in Step S109, data input and output unit 117 transfers the scan data obtained in Step S103 to the specified Web server 400 through LAN terminal 121. Additionally, in Step S109, advertisement data conversion unit 124 converts the advertisement data into the advertisement data in the HTML format, and data input and output unit 117 transfers the advertisement data in the HTML format in association with the scan data to the specified Web server 400 through LAN terminal 121. That is, when the selection that the advertisement data cannot be inserted into the scan data is made in Step S30, the advertisement data is not inserted into the scan data but is transferred to Web server 400 in association with the scan data.

In Step S113, CPU 111 executes a mailer program (not shown) stored in RAM 112 to realize a mail transmission function, whereby the user address accepted in Step S101 is notified by mail of URL (Uniform Resource Locator) which are of access information on the Web server to which the scan data is transferred and a password. At this point, preferably, display unit 114 displays on operation panel 110 a notification screen shown in FIG. 11, and the user is notified of the completion of the scan data transfer and the user address as a destination of the mail notification.

Figure 12:
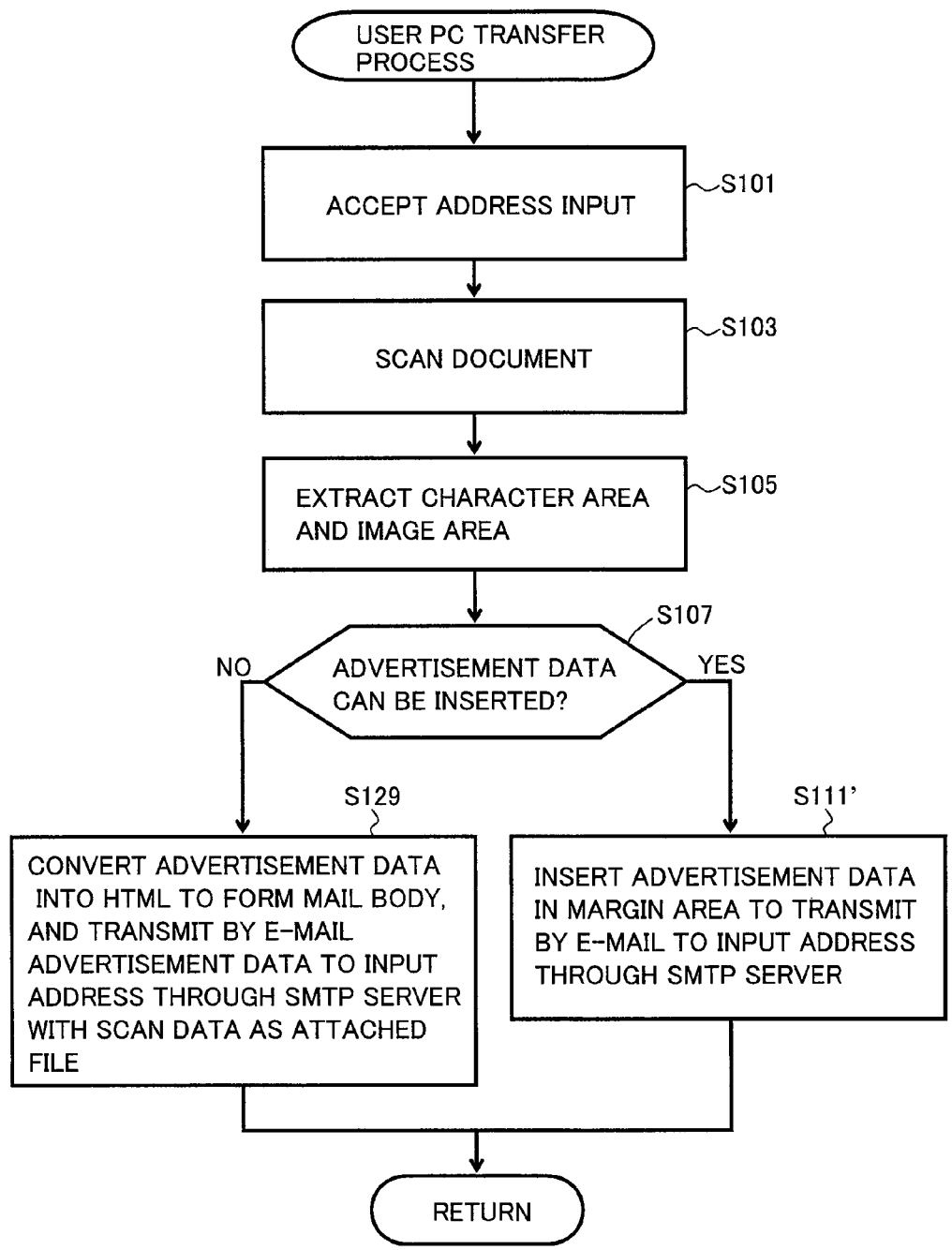
FIG. 12 is a flowchart showing a specific flow of a processing in Step S70 as a part of the processings of FIG. 4.
Figure 13:
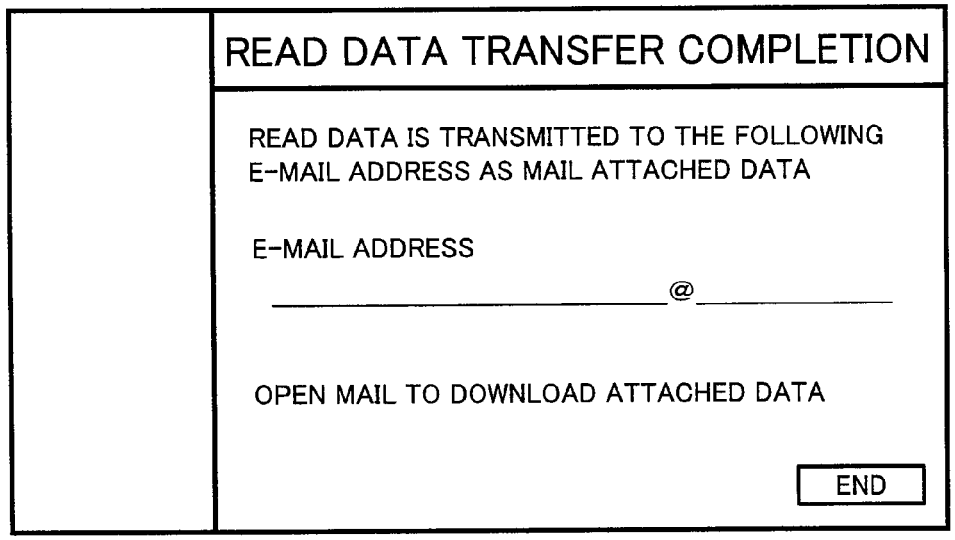
FIG. 13 shows a specific example of a screen.

FIG. 12 is a flowchart showing a specific flow of processing performed in Step S70 for transferring the scan data to user PC 200. FIG. 13 shows a specific example of the operating screen displayed on operation panel 110 by display unit 114 during the processing of FIG. 12. In FIG. 12, the same processing as that of FIG. 8 is designated by the same numeral. Therefore, processing that is different from the processing of FIG. 8 will mainly be described below.

The processings in Steps S101 to S105 are performed in processing for transferring the scan data to user PC 200. When the selection that the advertisement data can be inserted into the scan data is made in Step S30 (YES in Step S107), in Step S111', image processing unit 122 inserts the advertisement data into the margin area except for the areas extracted in Step S105. Data input and output unit 117 transfers the scan data inserted with the advertisement data to SMTP server 300 through LAN terminal 121 along with information indicating the address accepted in Step S101. Therefore, SMTP server 300 transmits the scan data to the address accepted in Step S101 by e-mail.

When the selection that the advertisement data cannot be inserted into the scan data is made in Step S30 (NO in Step S107), the mail data is generated as follows in Step S129. Advertisement data conversion unit 124 converts the advertisement data into the advertisement data in the HTML format. Mail production unit 125 sets the advertisement data in the HTML format to a mail body. Mail production unit 125 sets the scan data obtained in Step S103 to a file attached to the mail. Data input and output unit 117 transfers the generated mail data to SMTP server 300 through LAN terminal 121 along with the address accepted in Step S101. Therefore, SMTP server 300 transmits the mail data including the scan data as the attached file to the address accepted in Step S101 by mail. That is, when the selection that the advertisement data cannot be inserted into the scan data is made in Step S30, the advertisement data is not inserted into the scan data but is transferred to SMTP server 300 in association with each other. At this point, preferably, display unit 114 displays on operation panel 110 a notification screen shown in FIG. 13, and the user is notified of the completion of the mail data transmission and the user address as a destination of the mail transmission.

Figure 14:
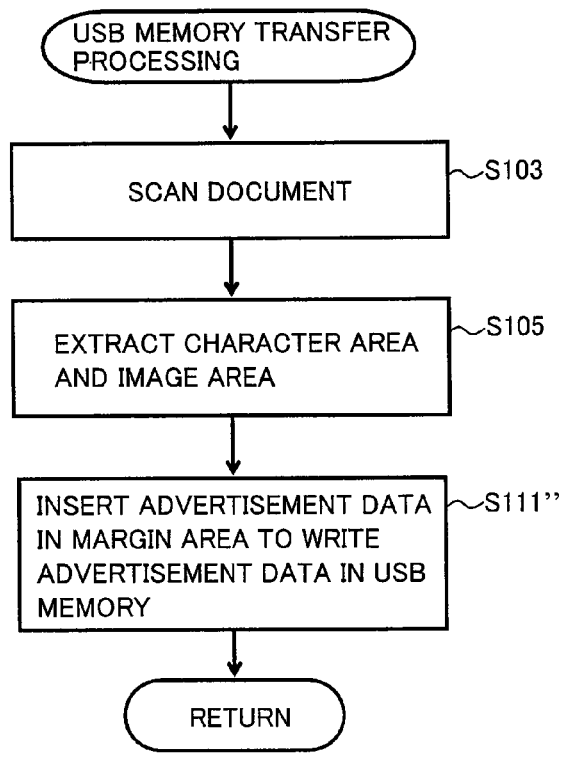
FIG. 14 is a flowchart showing a specific flow of a processing in Step S80 as a part of the processings of FIG. 4.
Figure 15:
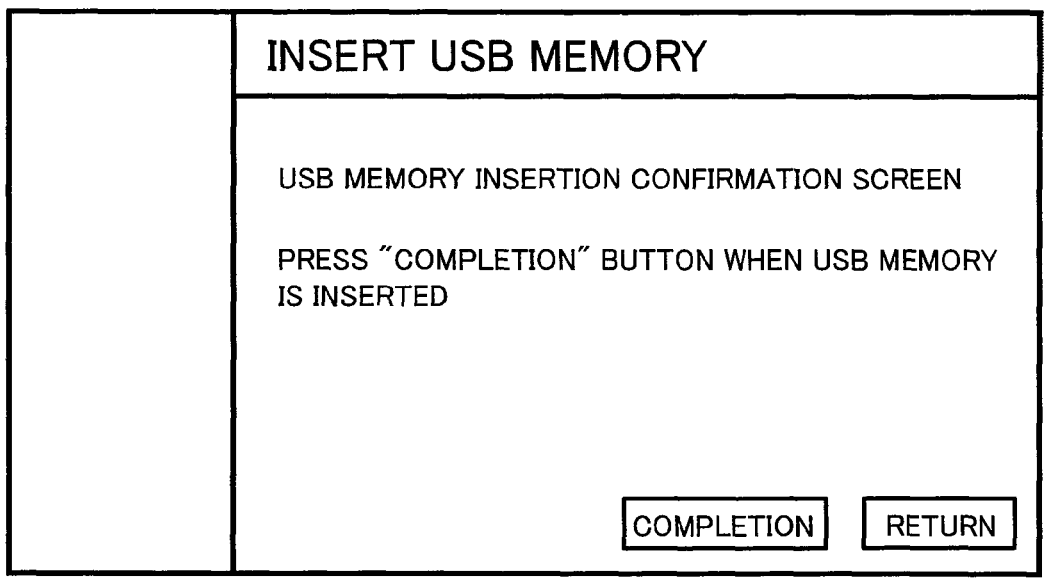
FIGS. 15 and 16 show specific examples of screens.
Figure 16:
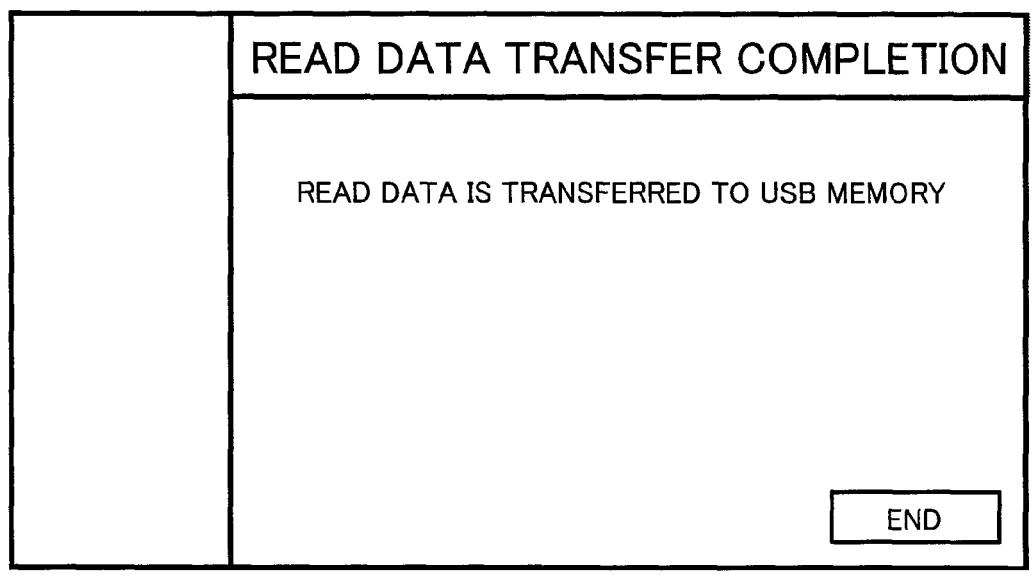

FIG. 14 is a flowchart showing a specific flow of processing performed in Step S80 for transferring the scan data to USB memory 10. FIGS. 15 and 16 show specific examples of the operating screen displayed on operation panel 110 by display unit 114 during the processing of FIG. 14. In FIG. 14, the same processing as that of FIG. 8 is designated by the same numeral. Therefore, processing that is different from the processing of FIG. 8 will mainly be described below.

Initially, display unit 114 displays a screen shown in FIG. 15 on operation panel 110 to encourage the user to attach USB memory 10 to MFP 100. CPU 111 detects the press of the button indicating that insertion of USB memory 10 is completed on the screen of FIG. 15, thereby detecting the insertion of USB memory 10. CPU 111 may detect the attachment of USB memory 10 based on a sensor signal by providing a sensor in an attachment unit (not shown).

The processings in Steps S103 and S105 are performed in the processing for transferring the scan data to USB memory 10. Because the advertisement data is inserted into the scan data in transferring the scan data to USB memory 10, the determination is not made in Step S107, and in Step S111" image processing unit 122 inserts the advertisement data into the margin area except for the areas extracted in Step S105. Recording medium write unit 120 writes the scan data inserted with the advertisement data in USB memory 10. At this point, preferably, display unit 114 displays a notification screen shown in FIG. 16 on operation panel 110, and the user is notified of the completion of the transfer of the scan data inserted with the advertisement data to USB memory 10.

MFP 100 performs the processings to realize the following transfer processing in the "charge-free scan mode".

Figure 17:
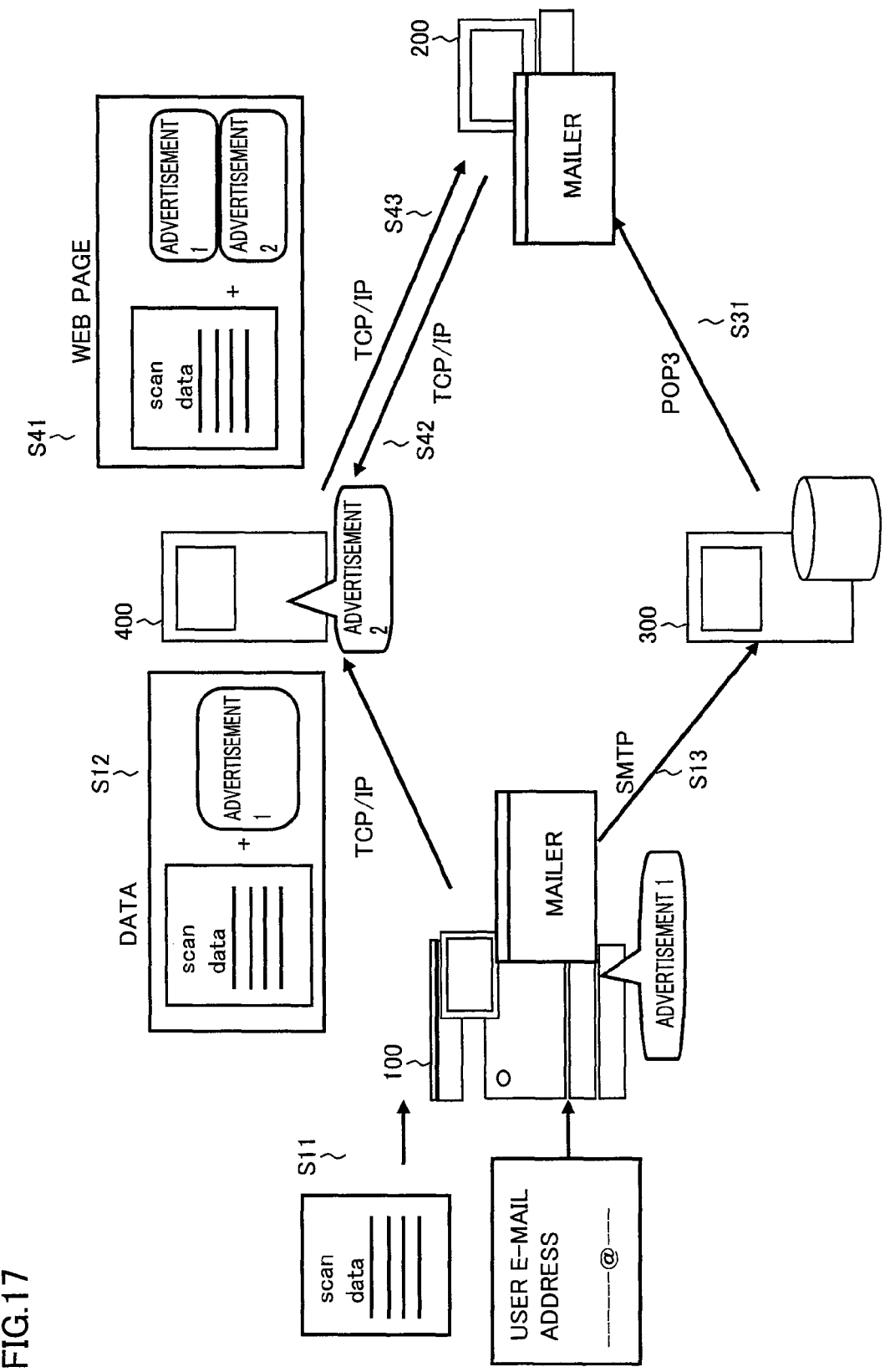
FIG. 17 shows a flow of a processing for providing scan data on a Web page without inserting advertisement data into the scan data.

When the forwarding destination is Web server 400, as shown in FIG. 17, MFP 100 obtains the scan data and the user address as the forwarding destination (Step S11). The processing in Step S11 corresponds to the processings in Steps S101 and S103. The scan data and the advertisement data converted into the HTML format are transferred to Web server 400 (Step S12). The processing in Step S12 corresponds to the processings in Steps S105 and S109. In a case where MFP 100 and Web server 400 are connected through the Internet, the transfer is realized by a communication method pursuant to TCP/IP (Transmission Control Protocol/Internet Protocol).

When MFP 100 is installed in a store, an advertisement of the store corresponds to the advertisement data (advertisement data referred to as an "advertisement 1" in FIG. 17) transferred in Step S12. That is, in installing MFP 100, the advertisement data can previously be stored in advertisement data storage unit 123 by the store as an advertising client. A mail transmission function (not shown) of MFP 100 notifies the user address of user PC 200 obtained in Step S11 through SMTP server 300 of the URL of Web server 400 and the password (Steps S13 and S31). The processings in Steps S13 and S31 correspond to the processing in Step S113. In the case where the password is not set, the user PC 200 may be notified of only URL of Web server 400 in Steps S13 and S31 (S113). At this point, the notification may include the advertisement data. Additionally, the notification may include other pieces of information such as information on scan date and information for identifying MFP 100. In the case where MFP 100 and SMTP server 300 are connected through the Internet, the transfer is realized by a communication method pursuant to SMTP (Simple Mail Transfer Protocol). In the case where SMTP server 300 and user PC 200 are connected through the Internet, the transfer is realized by a communication method pursuant to POP3 (Post Office Protocol 3).

The user specifies URL of Web server 400 included in the notification to access Web server 400 from user PC 200, and the user makes a request for appropriate information to Web server 400 (while passing the password to Web server 400) (Step S42). Web server 400 generates information for providing the scan data transferred from MFP 100 in Step S12 and the advertisement data (advertisement 1) converted into the HTML format as different pieces of data in one Web page (Step S41), and Web server 400 transfers the information to user PC 200 (S43). In the case where Web server 400 and user PC 200 are connected through the Internet, the transfer is realized by a communication method pursuant to TCP/IP.

Figure 18A:
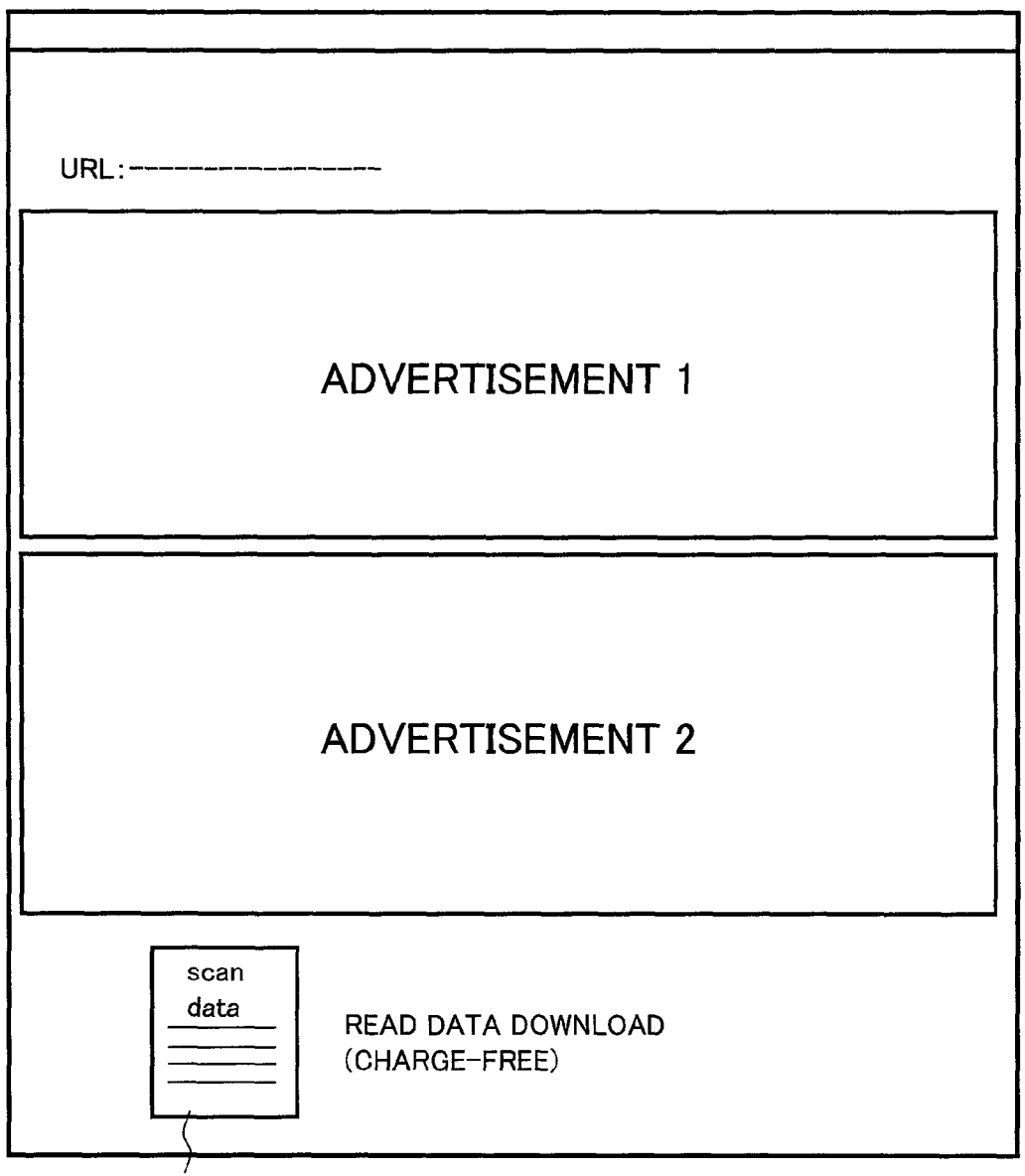
FIG. 18A shows a specific example of display on the Web page.
Figure 18B:
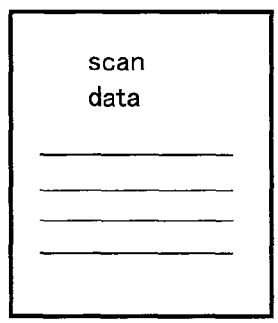
FIG. 18B shows a specific example of the scan data to be downloaded.

The method for generating the information on the Web page using Web server 400 in Step S41 is not limited to a particular method. However, Web server 400 generates the Web page in which at least the advertisement data is exhibited when providing the scan data transferred in Step S12. FIG. 18A shows a preferable example of the method. In the method of FIG. 18A, there is generated information on the Web page indicating contents of the advertisement data and an icon for providing an instruction of download serving as the information for accepting a request for the scan data (i.e., means used by the user for obtaining the scan data). More preferably, contents of the advertisement data are indicated in an upper portion of the Web page or at a position such as a first page to be browsed first by the user, and the information for accepting the request for the scan data is indicated in a lower portion of the Web page or at a position such as pages subsequent to the first page, i.e., at a position following the contents of the advertisement data body to be browsed after going though a position of a content to be shown after browsing the advertisement data body. In a more preferable specific example, contents of the advertisement data are indicated at the position to be browsed first by the user on the Web page, means (such as "confirmation button") for confirming that the user browses the contents of the advertisement data is indicated, and the information for accepting the request for the scan data is indicated after the browse is confirmed by the means. In this case, the Web page shown in FIG. 18A is displayed in user PC 200 obtaining the information on the Web page. The user operates the information for accepting the request for the scan data such that the user clicks the icon on the screen display of FIG. 18A, which allows the user to obtain the scan data in which the advertisement data is not inserted into the margin area as shown in FIG. 18B.

In the above examples, Web server 400 generates the information on the Web page. Alternatively, as shown in FIG. 3, in MFP 100 functioning as the image forming apparatus, CPU 111 may include generation unit 1112 which generates the information on the Web page as described above, from the scan data stored in HDD 113 and the converted advertisement data according to the control signal from CPU 111. The generated information on the Web page is output from data input and output unit 117 to the above-described network through LAN terminal 121 and transferred to Web server 400.

In the above examples, MFP 100 performs the processing such that the advertisement data (advertisement 1) is provided along with the scan data, and is transferred to Web server 400. Alternatively, as shown in FIG. 17, similarly Web server 400 may perform the processing such that the advertisement data (advertisement 2) is provided along with the scan data. In this case, in Step S41, Web server 400 generates the information for providing the advertisement data (advertisement 2) previously stored in Web server 400 and the scan data and advertisement data (advertisement 1) transferred from MFP 100 in Step S12 in association with one another on the one Web page, as shown in FIG. 18A. Accordingly, the advertising effectiveness can be improved without losing the convenience for the user.

Figure 19:
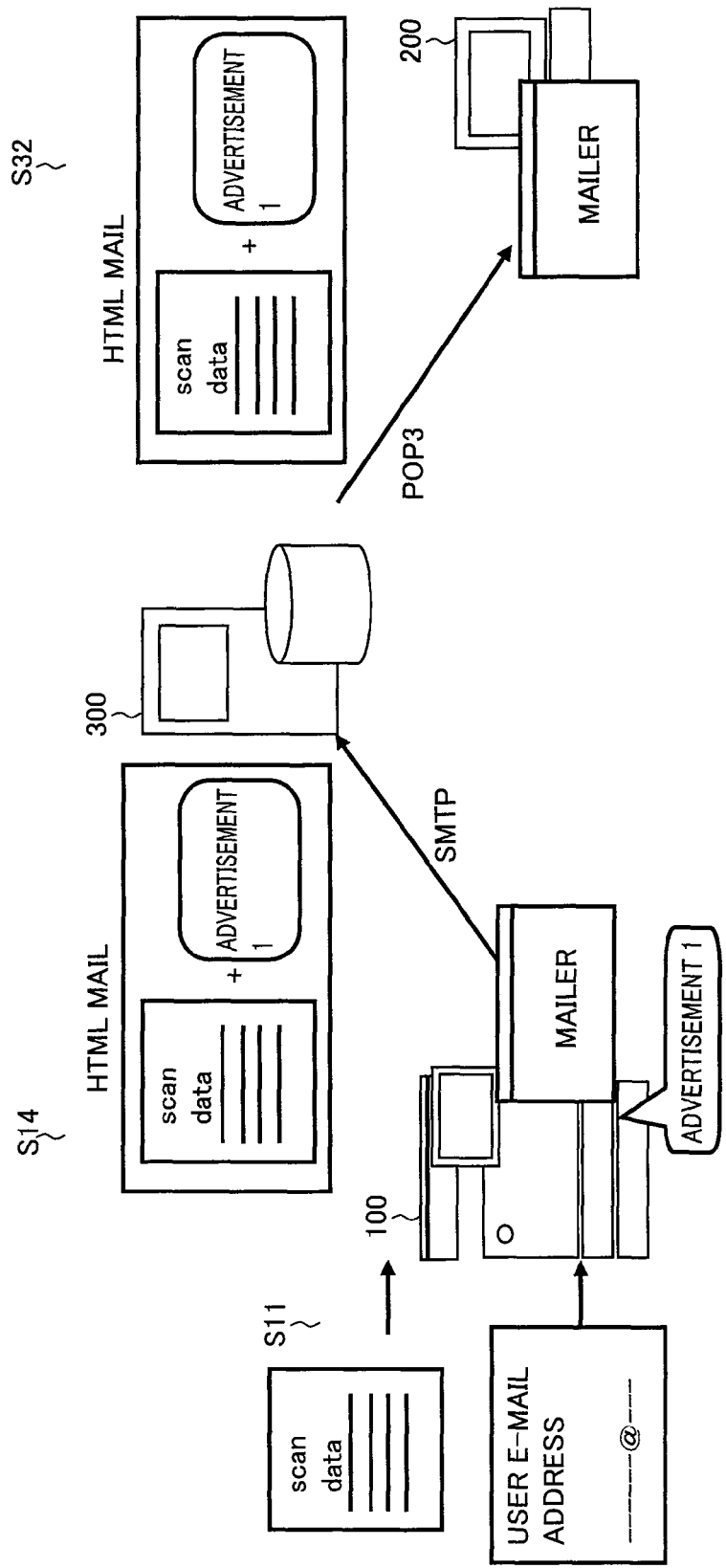
FIG. 19 shows a flow of a processing for providing the scan data via a mail without inserting the advertisement data into the scan data.

When the forwarding destination is user PC 200, as shown in FIG. 19, MFP 100 obtains the scan data and the user address as the forwarding destination (Step S11). MFP 100 generates the mail data in which the scan data is set to the attached file while the advertisement data is set to the body, and MFP 100 transfer the mail data to user PC 200 through SMTP server 300 (Steps S14 and S32). The processings in Steps S14 and S32 correspond to the processing in Step S129.

Figure 20:
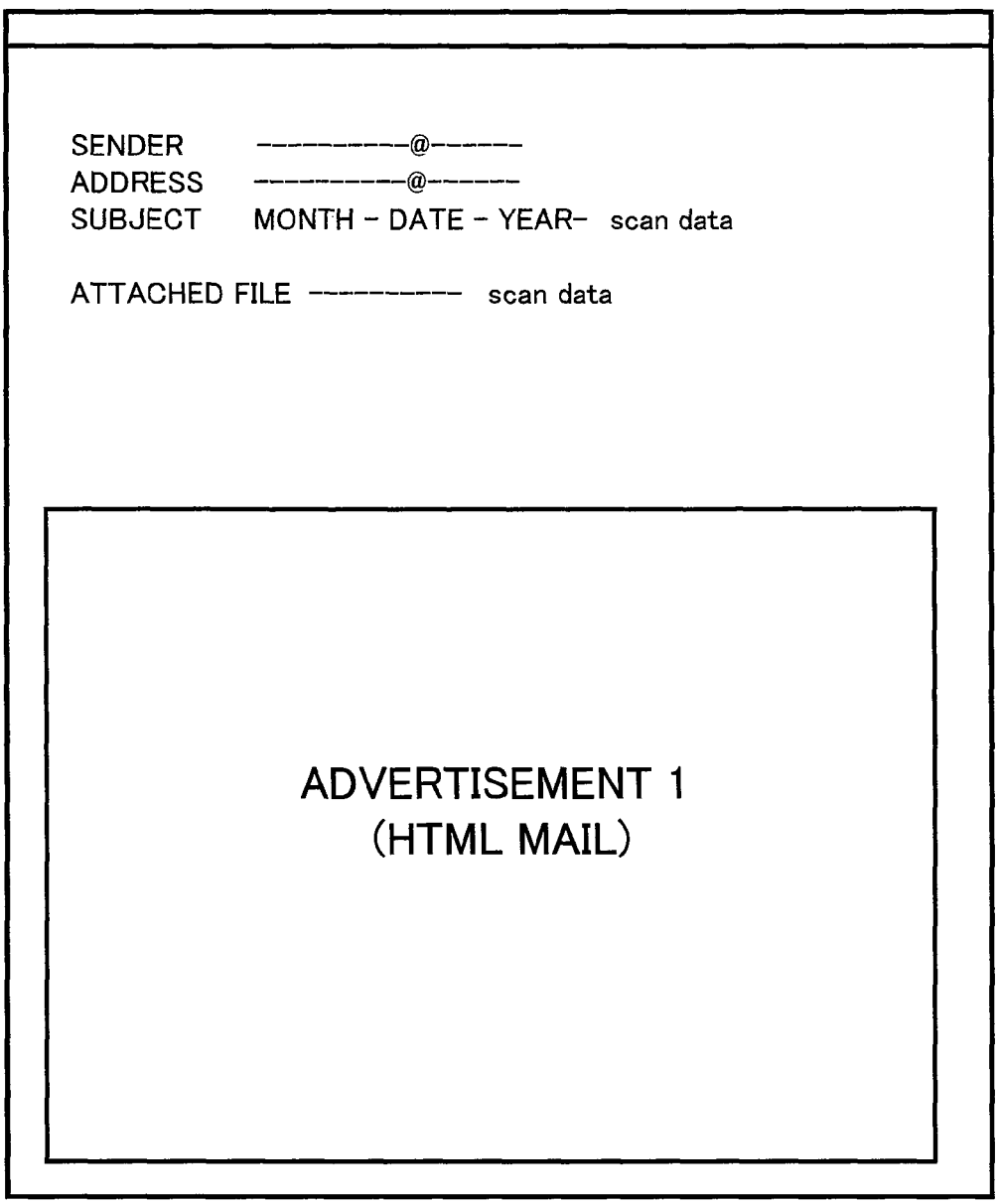
FIG. 20 shows a specific example of a screen displaying the mail.

A mail screen shown in FIG. 20 is displayed in user PC 200 receiving the mail data. The user performs an operation for opening the attached file in the mail screen of FIG. 20, which allows the user to obtain the scan data in which the advertisement data is not inserted into the margin area as shown in FIG. 18B.

When the user desires scan data inserted with no advertisement data, MFP 100 functioning as the image forming apparatus performs the above transfer processing, or MFP 100 functioning as the image forming apparatus and SMTP server 300 perform the above transfer processing, whereby the desired scan data can be provided while the advertising effectiveness is also improved.

Figure 21:
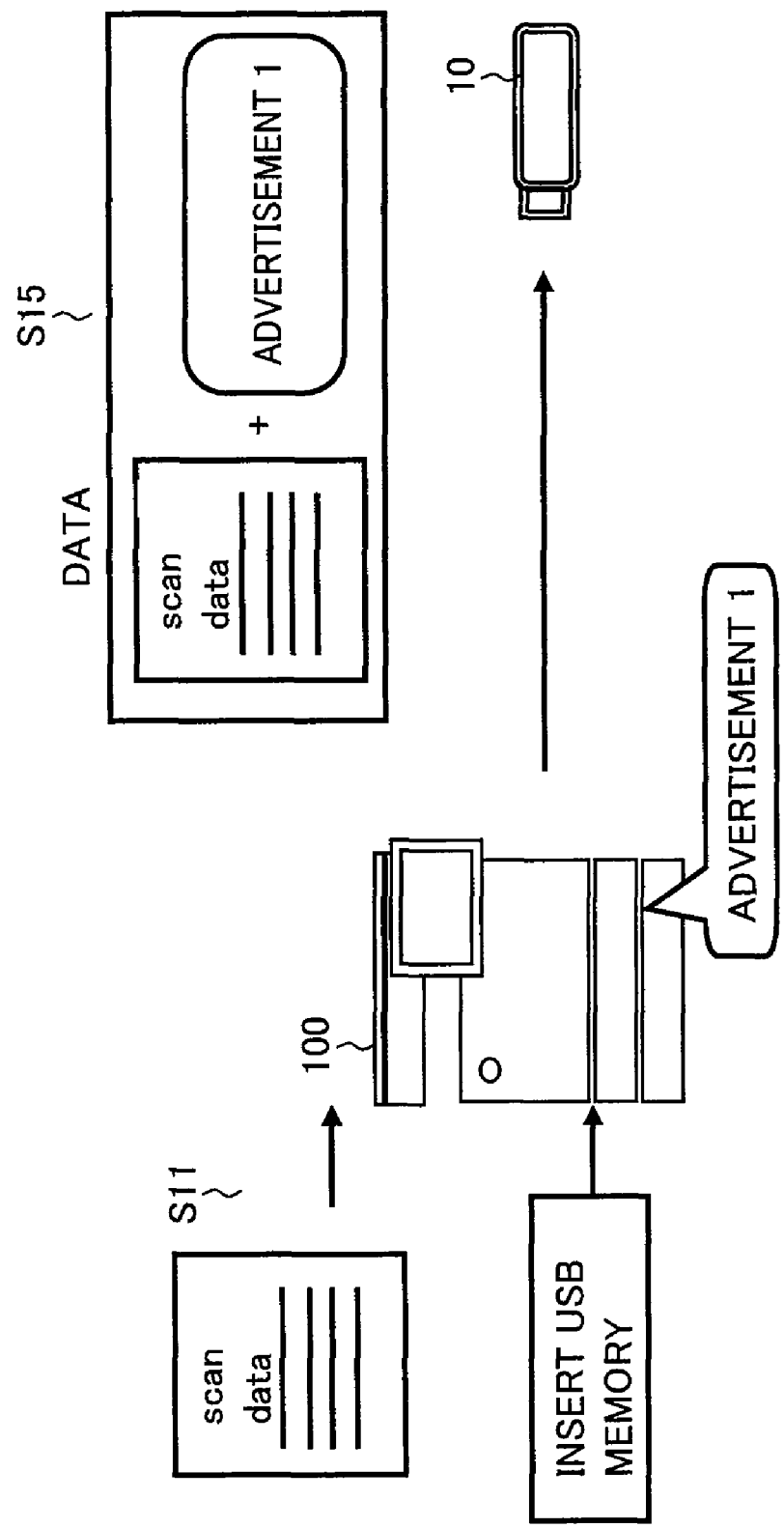
FIG. 21 shows a flow of a processing for providing the scan data inserted with the advertisement data by writing in a recording medium.

As shown in the above specific example, the scan data is sometimes directly written in the recording medium such as USB memory 10 as the forwarding destination. In such cases, as shown in FIG. 21, MFP 100 obtains the scan data and the information indicating that the recording medium such as USB memory 10 is inserted (Step S11). MFP 100 writes the scan data in USB memory 10 while the advertisement data is inserted into the margin area of the scan data (Step S15). The processing in Step S15 corresponds to the processing in Step S111".

Figure 22:
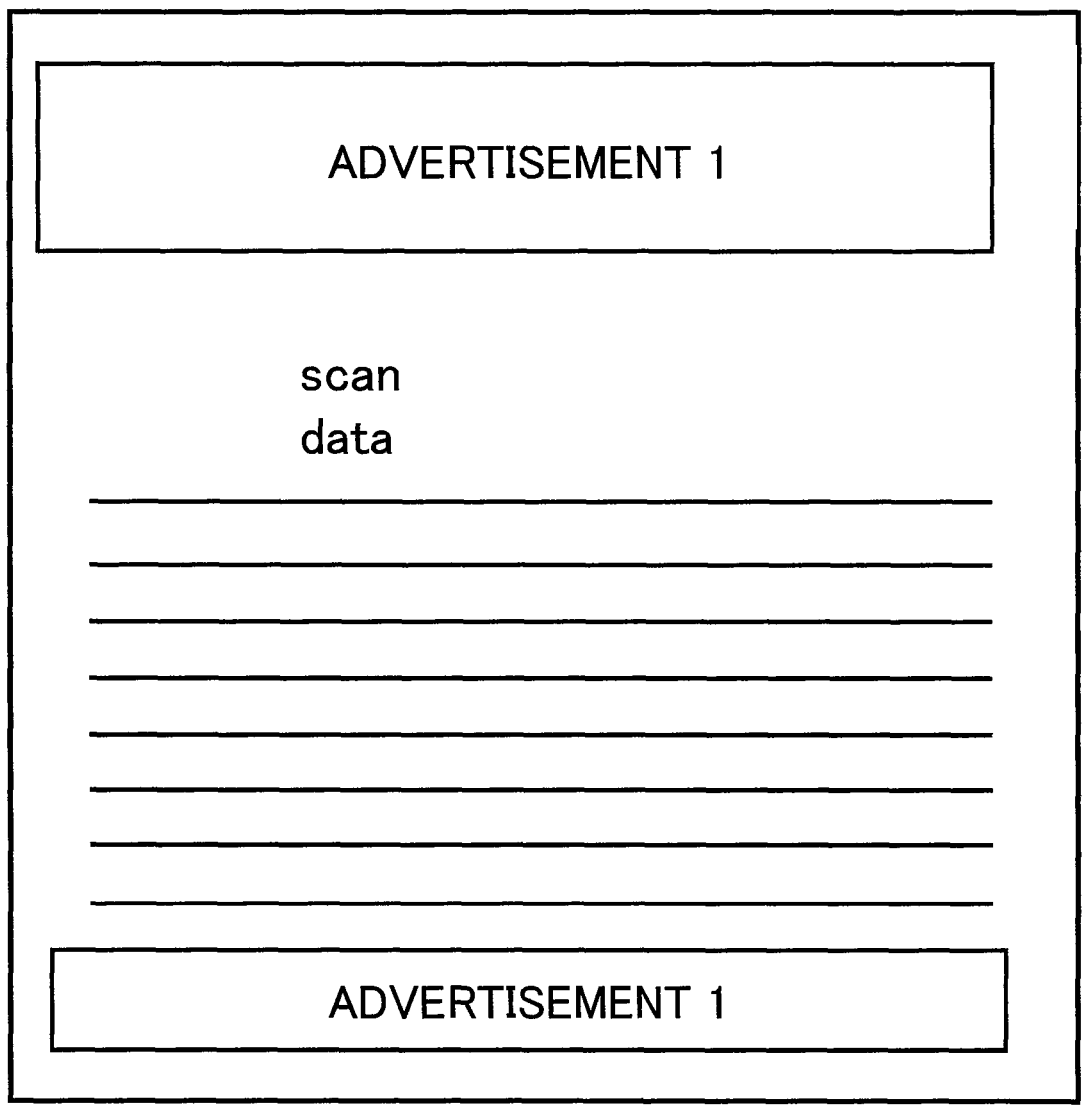
FIG. 22 shows the scan data inserted with the advertisement data, which scan data is written in the recording medium.

The information written in USB memory 10 is displayed by user PC 200 and the like as shown in FIG. 22. That is, in the information written in USB memory 10, the advertisement data is inserted into the margin area of the scan data. Using the image processing device such as user PC 200, the user performs processing for deleting the advertisement data from the scan data written in USB memory 10. Therefore, the user can obtain the scan data in which the advertisement data is not inserted into the margin area as shown in FIG. 18B.

A program for causing a computer to perform the processings performed in MFP 100 or the processings performed in the image forming system including MFP 100 can also be provided. The program can be provided as a program product while recorded in a computer-readable recording medium, such as a flexible disk, CD-ROM (Compact Disk-Read Only Memory), ROM (Read Only Memory), RAM, and a memory card, which is attached to the computer. Alternatively, the program can be provided while recorded in a recording medium such as a hard disk incorporated into the computer, or the program can be provided by downloading the program through the network.

In the program of the present invention, necessary modules in a predetermined array may be invoked at predetermined timing to perform the processings in program modules provided as a part of Operating System (OS) of the computer. In such cases, the modules are not included in the program, but the processings are performed in conjunction with OS. The program of the present invention shall include the program which does not include the module.

The program of the present invention may be provided while partially incorporated into another program. In such cases, the modules included in another program are not included in the program of the present invention, but the processings are performed in conjunction with another program. The program of the present invention shall include the program partially incorporated into another program.

The provided program product is installed in the program storage unit such as the hard disk, and the program is executed. The program product shall include the program of itself and the recording medium in which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
   a scanner scanning a document to obtain scan data;
   an insertion unit inserting advertisement data into said scan data;
   a specification unit specifying a forwarding destination of said scan data;
   a transfer unit transferring said scan data to said forwarding destination;
   a determination unit determining whether said specified forwarding destination is a forwarding destination allowing a user to select whether said advertisement data can be inserted into said scan data;
   a selection unit accepting a selection of whether insertion of said advertisement data into said scan data is allowed or not from the user, when said determination unit determines that said specified forwarding destination is a forwarding destination allowing a user to select whether said advertisement data can be inserted into said scan data; and
   a controller controlling insertion of said advertisement data by said insertion unit and transfer by said transfer unit, wherein
   said controller causes said insertion unit to perform a processing for inserting said advertisement data into said scan data and causes said transfer unit to transfer said scan data inserted with said advertisement data to said forwarding destination, when a forwarding destination that does not allow a user to select whether said advertisement data can be inserted into said scan data is specified, or when a forwarding destination that allows a user to select whether said advertisement data can be inserted into said scan data is specified and insertion of said advertisement data into said scan data is allowed by the user, and said controller causes said insertion unit not to perform the processing for inserting said advertisement data into said scan data and causes said transfer unit to transfer to said forwarding destination said scan data and said advertisement data in association with each other, when a forwarding destination that allows a user to select whether said advertisement data can be inserted into said scan data is specified, and insertion of said advertisement data into said scan data was not allowed by the user.

2. The image forming apparatus according to claim 1, wherein said controller causes said insertion unit not to perform the processing for inserting said advertisement data into said scan data, and causes said transfer unit to transfer to said forwarding destination said scan data and said advertisement data in association with each other, when a forwarding destination identified by a Web server or a user terminal is specified, and insertion of said advertisement data into said scan data was not allowed by the user.

3. The image forming apparatus according to claim 1, further comprising:
a conversion unit converting said advertisement data into a data format in order to display said advertisement data on a screen providing said scan data, wherein
said controller causes said transfer unit to transfer to said forwarding destination said scan data and said advertisement data converted by said conversion unit in association with each other.

4. The image forming apparatus according to claim 1, further comprising:
an acceptance unit accepting, when a Web server is specified as said forwarding destination, specification of a notifying destination of information on access to said Web server; and
a notification unit notifying said specified notifying destination that has been accepted of said information on access to said Web server.

5. The image forming apparatus according to claim 1, further comprising:
a first generation unit generating information on a Web page, said information including said advertisement data and scan information used for presenting said scan data,
wherein said controller causes said transfer unit to transfer to a Web server the information on said Web page generated by said first generation unit, when said Web server is specified as said forwarding destination and insertion of said advertisement data into said scan data was not allowed by the user.

6. The image forming apparatus according to claim 1, further comprising:
a second generation unit generating mail data provided with information including said advertisement data as a body and said scan data as an attached file,
wherein said controller causes said transfer unit to transfer said mail data generated by said second generation unit to a mail server in order to transmit said mail data to an electronic mail address, when a user terminal identified by said electronic mail address is specified as said forwarding destination, and insertion of said advertisement data into said scan data was not allowed by the user.

7. The image forming apparatus according to claim 1, further comprising:
a writing unit writing information into a detachable recording medium, wherein said controller causes said insertion unit to perform the processing for inserting said advertisement data into said scan data when said recording medium is specified as said forwarding destination, and said insertion unit inserts said advertisement data into said scan data by embedding said advertisement data in a margin area of said scan data.

8. A method for providing image information from an image forming apparatus to another apparatus, said image forming apparatus including an image scanner, the method comprising:
a step of scanning a document by using said image scanner to obtain scan data;
a specifying step of accepting specification of a forwarding destination of said scan data;
a determining step of determining whether said specified forwarding destination is a forwarding destination allowing a user to select whether advertisement data can be inserted into scan data;
an acceptance step of accepting a selection of whether insertion of said advertisement data into said scan data is allowed or not from the user, when said specified forwarding destination is a forwarding destination that allows a user to select whether said advertisement data can be inserted into said scan data,
a first transfer step of inserting advertisement data into said scan data, and transferring to said forwarding destination said scan data having said advertisement data inserted, when determined in said determining step that said specified forwarding destination is a forwarding destination that does not allow a user to select whether said advertisement data can be inserted into said scan data, or when determined that said specified forwarding destination is a forwarding destination that allows a user to select whether said advertisement data can be inserted into said scan data and a selection that allows insertion of said advertisement data into said scan data by the user is accepted at said acceptance step; and
a second transferring step of not inserting said advertisement data into said scan data and transferring to said forwarding destination said scan data and said advertisement data in association with each other, when determined in said determining step that said specified forwarding destination is a forwarding destination that allows a user to select whether said advertisement data can be inserted into said scan data and a selection that does not allow insertion of said advertisement data into said scan data by the user is accepted at said acceptance step.

9. The method for providing image information according to claim 8, wherein
in said specifying step, specification of any from a forwarding destination group including a Web server a destination identified by electronic mail address, and a recording medium that is detachable with respect to said image forming apparatus is accepted as a forwarding destination of said scan data,
in said determination step, a determination is made that said specified forwarding destination is a forwarding destination allowing a user to select whether said advertisement data can be inserted into said scan data, when said Web server or said destination identified by said electronic mail address is specified as said forwarding destination, and that said specified forwarding destination is not a forwarding destination allowing a user to select whether said advertisement data can be inserted into said scan data when said recording medium is specified as said forwarding destination, in said second transferring step, said advertisement data is not inserted into said scan data, and said scan data and said advertisement data are transferred in association with each other to said Web server, when said Web server is specified as said forwarding destination, and a selection that does not allow insertion of said advertisement data into said scan data by the user is accepted at said acceptance step, said advertisement data is not inserted into said scan data, and mail data provided with information including said advertisement data as a body and said scan data as an attached file is generated and transferred to said mail server, when a destination is identified by said electronic mail address is specified as said forwarding destination, and a selection that does not allow insertion of said advertisement data into said scan data by the user is accepted at said acceptance step, and said advertisement data is inserted into said scan data by embedding said advertisement data in a margin area of said scan data, and said scan data inserted with said advertisement data is transferred to said recording medium, when said recording medium is specified as said forwarding destination.

10. An image forming system comprising an image forming apparatus, a Web server, and a user terminal, connected with one another through an electronic communication line, wherein said image forming apparatus includes a scanner scanning a document to obtain scan data;

an insertion unit inserting advertisement data into said scan data;

a specification unit specifying a forwarding destination of said scan data;

a transfer unit transferring said scan data to said forwarding destination;

a determination unit determining whether said specified forwarding destination is a forwarding destination allowing a user to select whether said advertisement data can be inserted into said scan data;

a selection unit accepting a selection of whether insertion of said advertisement data into said scan data is allowed or not from the user, when said determination unit determines that said specified forwarding destination is a forwarding destination allowing a user to select whether said advertisement data can be inserted into said scan data; and a controller controlling insertion of said advertisement data at said insertion unit and transfer at said transfer unit, wherein said controller causes said insertion unit to perform a processing for inserting said advertisement data into said scan data and causes said transfer unit to transfer said scan data inserted with said advertisement data to said forwarding destination, when a forwarding destination that does not allow a user to select whether advertisement data can be inserted into said scan data is specified, or when a forwarding destination that allows a user to select whether said advertisement data can be inserted into said scan data is specified and insertion of said advertisement data into said scan data is allowed by the user, and said controller causes said insertion unit not to perform the processing for inserting said advertisement data into said scan data and causes said transfer unit to transfer to said forwarding destination said scan data and said advertisement data in association with each other, when a forwarding destination that allows a user to select whether said advertisement data can be inserted into said scan data is specified, and insertion of said advertisement data into said scan data was not allowed by the user, wherein said controller causes said insertion unit not to perform the processing for inserting said advertisement data into said scan data, and causes said transfer unit to transfer to said forwarding destination said scan data and said advertisement data in association with each other, when a Web server or a user terminal is specified, and insertion of said advertisement data into said scan data was not allowed by the user.

11. A method for providing image information from an image forming apparatus to another apparatus, said image forming apparatus including an image scanner, the method comprising:

a step of scanning said document by using said image scanner to obtain scan data;

a specifying step of accepting specification of a forwarding destination of said scan data;

a determination step of determining whether said specified forwarding destination is a forwarding destination allowing a user to select whether advertisement data can be inserted into said scan data, an acceptance step of accepting a selection of whether insertion of said advertisement data into said scan data is allowed or not from the user, when said specified forwarding destination is a forwarding destination that allows a user to select whether said advertisement data can be inserted into said scan data, a first transfer step of inserting advertisement data into said scan data, and transferring to said forwarding destination said scan data having said advertisement data inserted, when determined in said determination step that said specified forwarding destination is a forwarding destination that does not allow a user to select whether said advertisement data can be inserted into said scan data, or when determined that said specified forwarding destination is a forwarding destination that allows a user to select whether said advertisement data can be inserted into said scan data and a selection that allows insertion of said advertisement data into said scan data by the user is accepted at said acceptance step, and a second transfer step of not inserting said advertisement data into said scan data and transferring to said forwarding destination said scan data and said advertisement data in association with each other, when determined in said determining step that said specified forwarding destination is a forwarding destination that allows a user to select whether said advertisement data can be inserted into said scan data and a selection that does not allow insertion of said advertisement data into said scan data by the user is accepted at said acceptance step, wherein, in said second transfer step, the processing for inserting said advertisement data into said scan data is not performed, and said scan data and said advertisement data are transferred in association with each other to said forwarding destination, when a Web server or a user terminal is specified, and insertion of said advertisement data into said scan data was not allowed by the user.

* * * * *